United States Patent Office 2,729,913
Patented Jan. 10, 1956

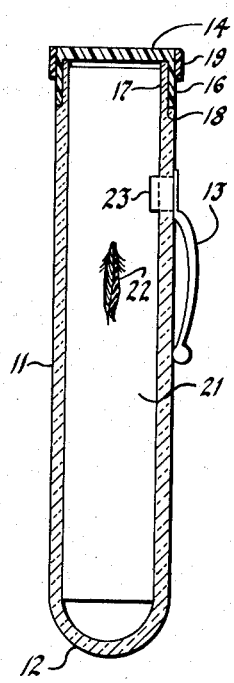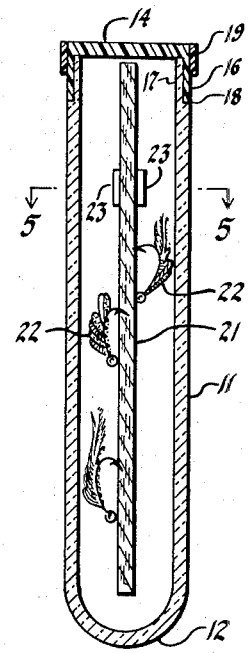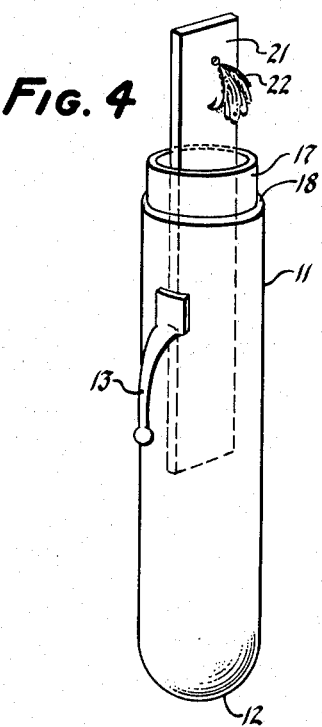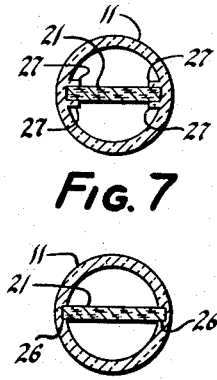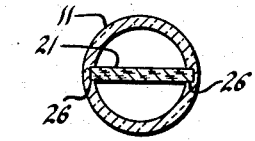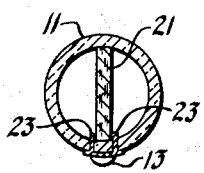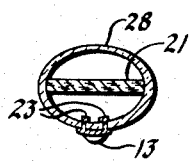

2,729,913

CONTAINER FOR FISHING FLIES

John J. Holwerda, Palo Alto, Calif.

Application September 16, 1953, Serial No. 380,443

1 Claim. (Cl. 43—57.5)

This invention relates to new and useful improvements in containers, particularly pocket containers for objects such as fishing flies, fish hooks and other objects having points which may be hooked onto a partition made of cork or like material positioned in the container.

The present invention comprises a display device which may be carried in the pocket of the user, being of a size to fit into a breast pocket of a jacket and clip onto the front of the pocket. For such purpose it may also be formed with a rounded bottom to facilitate insertion in the pocket.

The container is transparent so that the user may observe the contents.

Within the container is a partition of material such as cork which may be used to hold the hooks of fly hooks and like objects so that they may be spaced apart and thus more readily distinguished through the transparent container.

Where a partition is placed within the container, it is desirable to construct the container in such fashion that the partition cannot be turned around but when once in place will be non-rotatable and yet easily withdrawn from the container to remove the fly or other object selected.

The device is particularly useful to fishermen desiring to choose a suitable fly by inspection of the container which may be easily carried and which affords ready access. Similarly, the container may be loaded with a suitable assortment of flies at place of sale and thus serves as a display for contents.

Other objects of the present invention will become apparent upon reading the following specification and referring to the accompanying drawings in which similar characters of reference represent corresponding parts in each of the several views.

In the drawings:

Fig. 1 is a perspective of a container made in accordance with this invention.

Fig. 2 is a vertical section therethrough.

Fig. 3 is a vertical section through the container with the section being taken 90° displaced from that of Fig. 2.

Fig. 4 is a perspective showing the cap of the container removed and the partition partially removed.

Fig. 5 is a transverse section taken substantially along the line 5—5 of Fig. 3.

Figs. 6, 7 and 8 are transverse sections of modified devices taken substantially along the line 5—5 of Fig. 3.

The present invention comprises a water-proof container having a cylindrical casing 11 of a transparent material such as suitable plastic material which may be carried in the jacket pocket of the user. In cross-section the container is preferably round or elliptical and its bottom 12 is preferably rounded so that the container may easily be slipped into the pocket without difficulty. A convenient size for the container is approximately four and one-half inches in length and a diameter of approximately seven-eighth inch.

In order to assist in securing the container in the pocket of the user a conventional spring clip 13 is fixed on the outside of the casing.

A cap 14 is provided fitting over the top edge of the container. Preferably the cap has a depending skirt 16 which fits down over a necked-in portion 17 at the top of the container and rests against a shoulder 18 at the bottom of the necked-in portion. To facilitate placing and removal of the cap a serrated rim 19 is formed on the upper part of the skirt 16.

Fitting inside the container is a removable partition 21 which is generally rectangular in shape being approximately as long as the casing and having a width slightly less than the internal diameter of the container. The material of which the partition is formed is preferably cork or some other similar material in which flies 22, fish hooks or other pointed objects may be stuck without impairing the sharpness of the points. Thus if the container is used for its intended purpose of transporting fishing flies, a plurality of flies 22 may be stuck on each side of the partition 21 where they are held without danger of being tangled together and are easily observed through the transparent casing 11 so that a selection may be rapidly and conveniently made. One side of the partition may be used to carry one size hook while the opposite side carries another size to thus insure segregation.

It is desirable that the partition 21 be held in the container so that it may be readily withdrawn and yet be held in such manner that it will not revolve inside the casing. Various means may be employed to prevent rotation of the partition within the container. As shown in Figs. 2, 3 and 5, the clip 13 on the exterior of the casing is so affixed thereto that it performs a dual function of being available to clip onto the pocket of the user and also to prevent rotation of the partition. Thus, a pair of spaced apart inwardly projecting prongs 23 integral with the clip 13 pass through the wall of the casing and project inside the container a sufficient distance so that they fit over a portion of the edge of each side of the partition 21 and thus prevent rotation of the partition.

In Fig. 6, a pair of longitudinal diametrically opposed grooves 26 are formed in the interior of the casing wall and the partition 21 is wider than the diameter of the interior of the casing and so its edges fit within the grooves, the partition being easily slidable from the casing and yet non-rotatable with respect thereto.

In Fig. 7 a pair of spaced lugs 27 is positioned in the inside of the casing on opposite sides of the container. The partition 21 is placed so that its opposite side edges are received between the lugs and the partition is prevented from rotating.

In Fig. 8 the casing 28 instead of being formed round is formed elliptical and the width of the partition 21 is greater than the minor axis of the ellipse, thereby preventing the partition from rotating.

Though simple the instant invention has the merit of furnishing an extremely convenient holder for fishing flies or the like and which enables the user to choose and withdraw an appropriate fly of suitable size with a minimum of effort and time loss. Similarly the structure is a self-contained display device for contents disposed therein.

Although I have described my invention in some detail by way of illustration and example for purposes of clarity of understanding, it is understood that certain changes and modifications may be practiced within the spirit of the invention and scope of the appended claim.

What is claimed is:

A container for fishing flies and the like comprising an elongated, tubular casing of transparent material closed at one end and open at the other, a cap for the open end of said casing, a removable partition within said casing extending longitudinally substantially from end to end thereof, said partition being formed of relatively soft material suitable for reception of pointed objects and disposed to bisect longitudinally said container, and a pocket clip on the exterior of said casing having a pair of spaced prongs extending through the wall of said casing, said prongs engaging portions of opposite edge surfaces of said partition to guide insertion and withdrawal and prevent rotation thereof.

References Cited in the file of this patent

UNITED STATES PATENTS

| | | |
|---|---|---|
| 1,714,744 | Wahl | May 28, 1929 |
| 1,888,304 | Bekeart | Nov. 22, 1932 |
| 1,904,212 | Esterow | Apr. 18, 1933 |
| 2,232,621 | Monroe | Feb. 18, 1941 |
| 2,578,424 | Hart | Dec. 11, 1951 |